(12) United States Patent
Paskins

(10) Patent No.: US 6,347,399 B1
(45) Date of Patent: Feb. 12, 2002

(54) INTERFACE FOR A RECEIVER AND METHOD OF ARRANGEMENT THEREOF

(75) Inventor: Adrian Charles Paskins, Basingstoke (GB)

(73) Assignee: Sony United Kingdom Limited (GB)

( * ) Notice: Subject to any disclaimer, the term of this patent is extended or adjusted under 35 U.S.C. 154(b) by 0 days.

(21) Appl. No.: 09/206,444

(22) Filed: Dec. 7, 1998

(30) Foreign Application Priority Data

Dec. 9, 1997 (GB) .............................................. 9726045

(51) Int. Cl.⁷ ................................................ H04N 7/16
(52) U.S. Cl. ......................... 725/25; 725/134; 725/142
(58) Field of Search .......................... 200/51.02, 51.03; 725/25, 134, 142

(56) References Cited

U.S. PATENT DOCUMENTS

| | | | | |
|---|---|---|---|---|
| 2,502,658 A | * | 4/1950 | Linkmark ..................... | 200/51 |
| 4,195,351 A | | 3/1980 | Barner et al. ............... | 364/900 |
| 5,659,780 A | * | 8/1997 | Wu ........................ | 395/800.19 |
| 5,774,133 A | * | 6/1998 | Neave et al. ............... | 345/505 |
| 6,076,133 A | * | 6/2000 | Brainard et al. ............ | 710/260 |

FOREIGN PATENT DOCUMENTS

| GB | GB 2 168574 A | 6/1986 |
|---|---|---|
| WO | WO 96/07267 | * 3/1996 |
| WO | WO 96 07267 | 3/1996 |

OTHER PUBLICATIONS

Cutts D. J.: DVB Conditional Access:, Electronics and Communication Engineering Journal, vol. 9, NR. 1, pp. 21–27 XP000722905.

Giachetti J–L Et Al.: "A Common Conditional Access Interface for Digital Video Broadcasting Decoders", IEEE Transactions on Consumer Electronics on Consumer Electronics, vol. 41, NR. 3, pp. 836–841 XP000539543.

* cited by examiner

Primary Examiner—Andrew Faile
Assistant Examiner—Kieu Oanh Bui
(74) Attorney, Agent, or Firm—Frommer Lawrence & Haug LLP; William S. Frommer; Joe H. Shallenburger

(57) ABSTRACT

An interface for connecting one or more conditional access modules to a receiver, the interface including a plurality of interface sections, each for connection with a respective socket for receiving a conditional access module and each having a plurality of input lines and a plurality of respective output lines for connection to said socket, the interface sections being arranged in series, with the input lines of one interface section being connected to the respective output lines of the next interface section and with each interface section including an electronically controllable switch connecting the output lines of that interface section to the input lines of the same interface section, such that each socket may be selectively by passed.

19 Claims, 5 Drawing Sheets

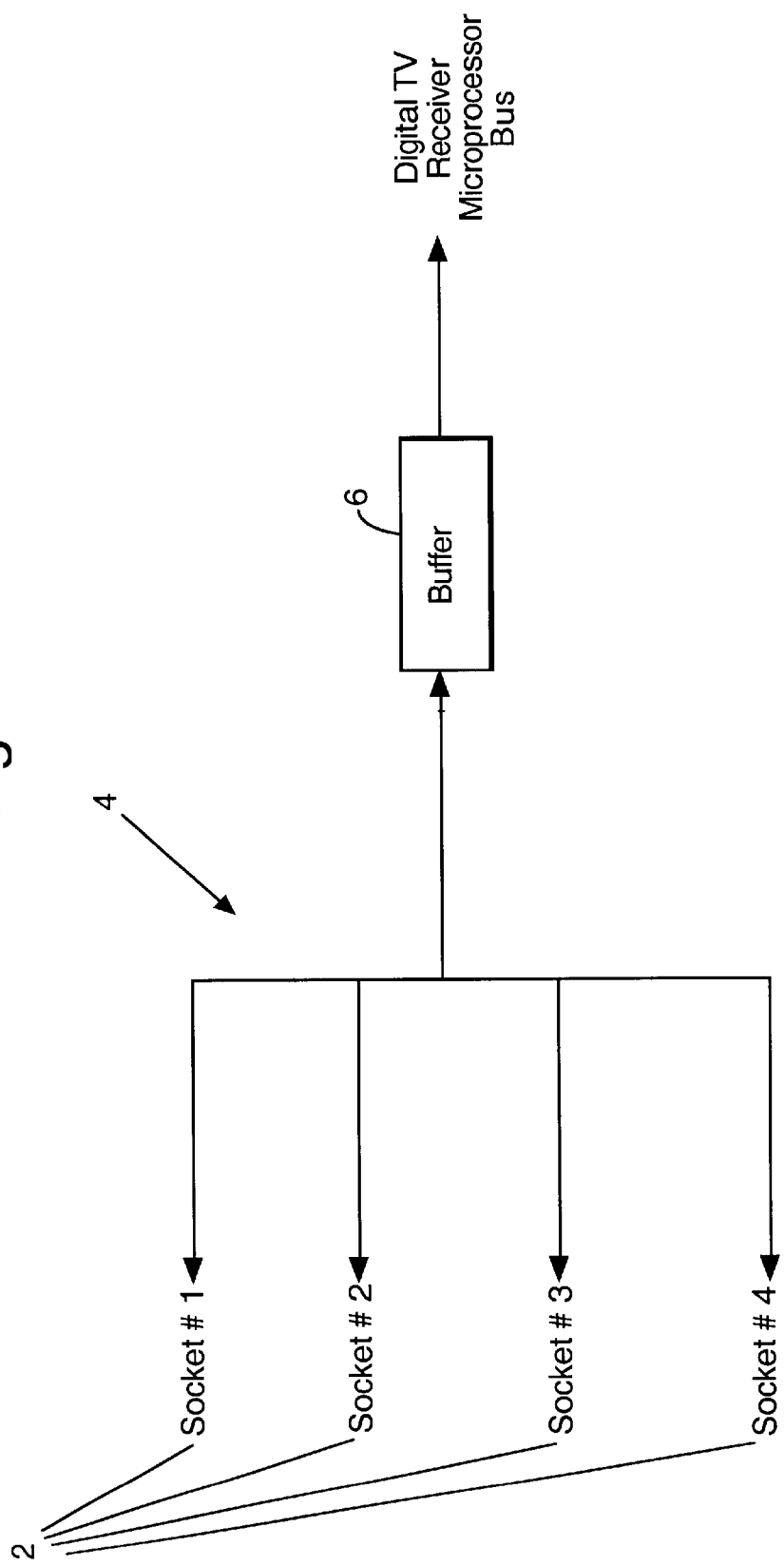

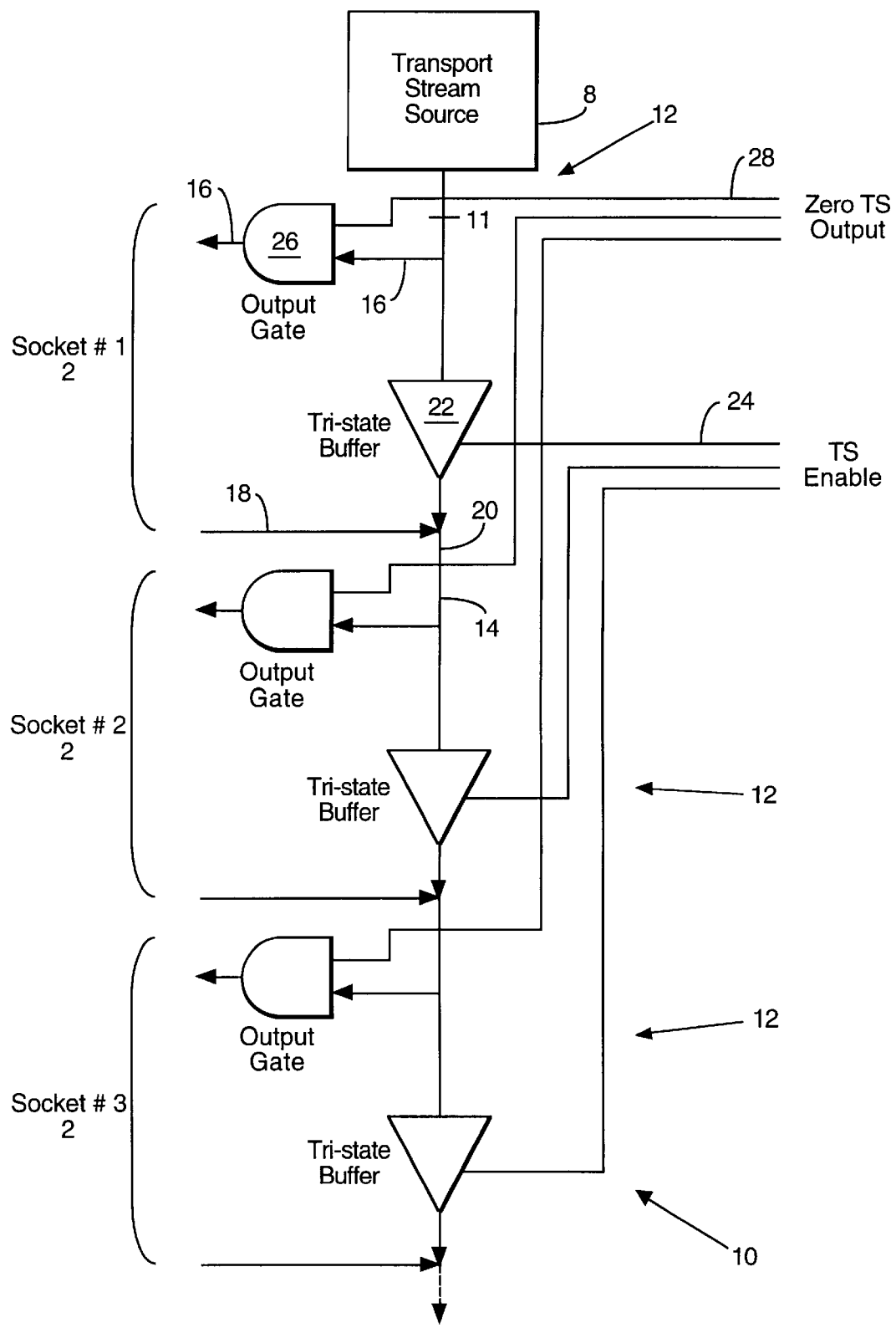

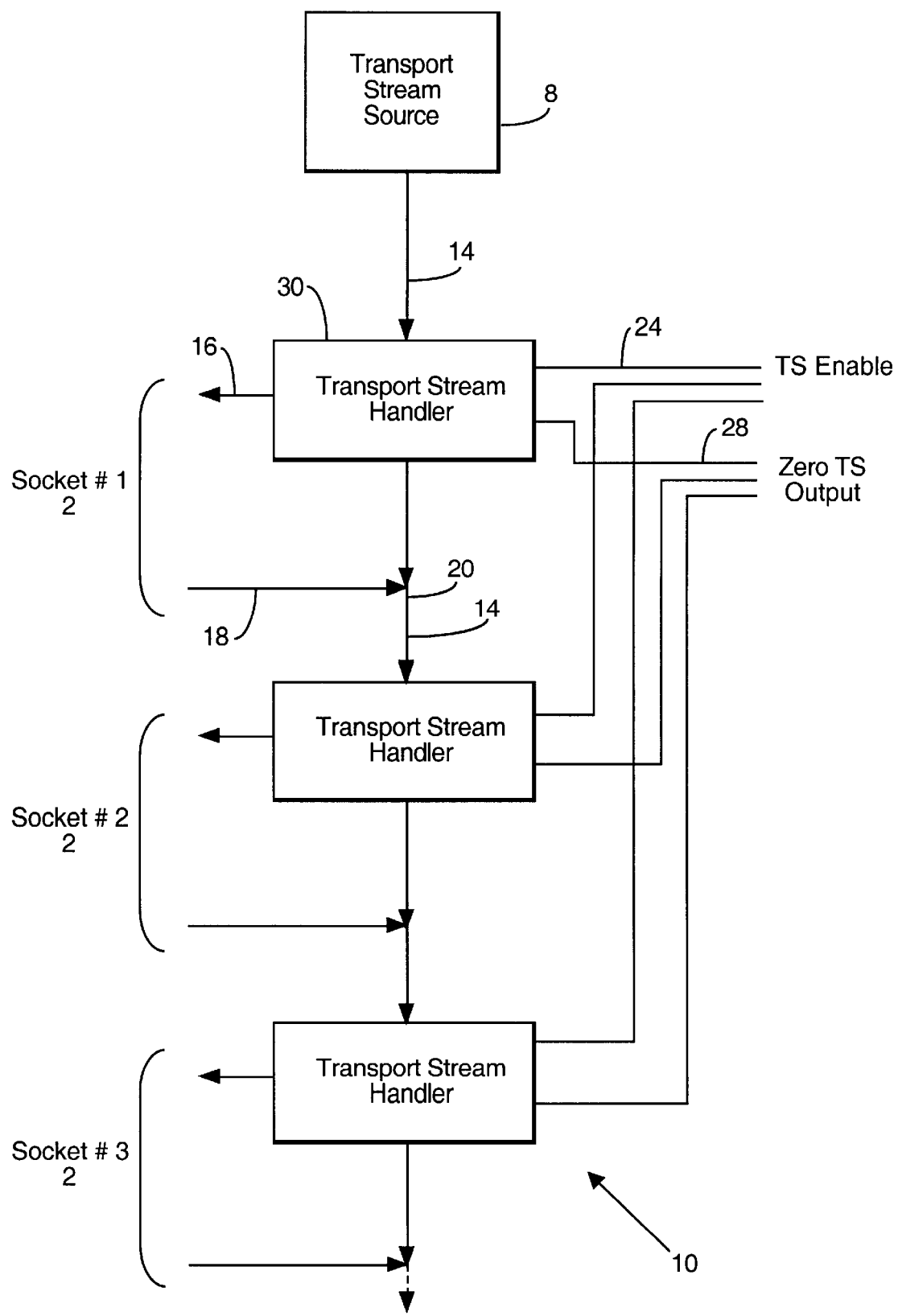

INTERFACE FOR A RECEIVER AND METHOD OF ARRANGEMENT THEREOF

BACKGROUND OF THE INVENTION

1. Field of the Invention

The present invention relates to an interface for a receiver, in particular for use with a conditional access sub-system, and a method of arranging such an interface.

2. Description of the Related Art

Set top boxes are known for digital video broadcasting (DVB). These decode a received digital video broadcast and provide suitable signals to a television, such that the received images may be displayed. Broadcasts often comprise scrambled or encrypted signals, such that only an authorised receiver can watch the broadcast television programs. In this respect, the set top box includes a conditional access system which is able to descramble a transmitted broadcast.

It has been proposed to provide a generic DVB receiver which could be provided as a set top box or as part of a television itself. To enable the DVB receiver to be used with various broadcast services, it has also been proposed that the DVB receiver should be provided with a number of sockets, each able to receive a conditional access sub-system (CASS) module. In particular, a standard has been proposed in the publication "Common Interface Specification for Conditional Access and Other Digital Video Broadcasting Decoder Applications CENELECEN50221". Each CASS module can hold information for descrambling one or more transmitted broadcasts. It can also hold service entitlement information, be controlled by the service provider and the service provider can communicate with the CASS module using encrypted messages carrying descrambler keys as service management information.

An interface is therefore to be provided between the common digital TV receiver and the CASS module sockets to allow each service provider to use their own unique conditional access system and allow the user to change the conditional access systems without changing the receiver.

OBJECTS AND SUMMARY OF THE INVENTION

The interface should allow a user to connect less than the maximum number of CASS modules to the receiver interface in arbitrary positions without hindering the correct functioning of the device.

According to the present invention, there is provided a method of arranging an interface for connecting one or more conditional access modules to a receiver, the interface including a plurality of interface sections, each for connection with a respective socket for receiving a conditional access module and each having a plurality of input lines and a plurality of respective output lines for connection to said socket, the method comprising:

arranging the interface sections in series, with the input lines of one interface section connected to the respective output lines of the next interface section, and connecting the output lines of each interface section to the input lines of the same interface section via an electronically controllable switch, such that, when a conditional access module is not connected to the socket of an interface section, that socket may be selectively by passed.

There is also provided an interface for connecting one or more conditional access modules to a receiver, the interface including:

a plurality of interface sections, each for connection with a respective socket for receiving a conditional access module and each having a plurality of input lines and a plurality of respective output lines for connection to said socket, the interface sections being arranged in series, with the input lines of one interface section being connected to the respective output lines of the next interface section and with each interface section including an electronically controllable switch connecting the output lines of that interface section to the input lines of the same interface section, such that each socket may be selectively by passed.

In this way, an apparatus in which the interface is used may control the interface to by-pass sockets where conditional access modules have not been connected. In particular, where, for instance, three out of four sockets are used, the apparatus can determine that the fourth socket is not in use and, therefore, by-pass it. In this way, a data transport stream may be passed consecutively between each interface section, socket and conditional access module without interruption.

It is proposed to provide 11 input and output lines, as will be discussed below. However, conventional switching circuits use 8 way switches. In order to carry out the necessary switching for the present invention, two parallel 8 way switches would be required, creating, not only undue cost in additional components, but also redundancy in the circuit itself.

Therefore, according to a preferred feature, the present invention uses 11-way tristate buffers for the electronically controllable switches.

When a conditional access module is connected to a socket, it may be necessary for it to go through an initialization process driven by other lines and pins not considered here. With the conditional access module connected to the series arrangement interface, problems may arise as a result of transport stream data passing to the CASS modules.

Therefore, according to a preferred embodiment, it is proposed that each interface section includes an electronically controllable output gate for connecting the plurality of output lines of that interface section to a respective socket, the output gate being controllable by a control line to be selectively driven to a predetermined level irrespective of the levels of the output lines.

Preferably, the predetermined level is zero.

While the above described arrangement is highly advantageous in function, it may be unsatisfactory in complexity and cost, requiring multiple connections and possibly the production of dedicated 11 way components.

In view of this, according to a preferred embodiment, each interface section may be part of a transport stream handler which is additionally controllable to selectively connect the plurality of output lines of that interface section to the respective socket or output a predetermined level in place of the levels on said plurality of output lines.

Hence, according to the present invention there is also provided an integrated circuit for use in a receiver, the integrated circuit comprising 11 input lines, 11 first output lines connected to the respective 11 input lines, 11 second output lines, an enable line for selectively connecting the input lines to the respective second output lines and a control line for selectively driving all the first output lines to zero irrespective of the levels of the input lines.

In this way, an interface section is produced generally as a single component, such that both the function of by-passing a socket and selectively driving the output lines to a zero level can be implemented with the same device.

The overall pin count for the interface may be reduced, since the input to both the by-pass switch and the logic gate are common, thereby reducing construction costs. Furthermore, only a single dedicated circuit need be produced, thereby making it more economically viable.

The present invention also has the advantage of very readily allowing the scaling of a device. In particular, a device using two interface sections or sockets can easily have further interface sections or sockets inserted with no other redesign requirements.

Preferably, the receiver is a digital video receiver, such as a DVB receiver.

Preferably, the sockets used are standard PC Card sockets, for instance as defined by the PCMCIA (Personal Computer Memory Card Industry Association) in the PC Card standard, February 1995.

BRIEF DESCRIPTION OF THE DRAWINGS

FIG. 1 illustrates the general arrangement of a DVB interface;

FIG. 2 illustrates a first embodiment of the present invention; and

FIGS. 3, 4(a) and 4(b) illustrate a second embodiment of the present invention.

DETAILED DESCRIPTION OF THE PREFERRED EMBODIMENTS

Figure 4A:
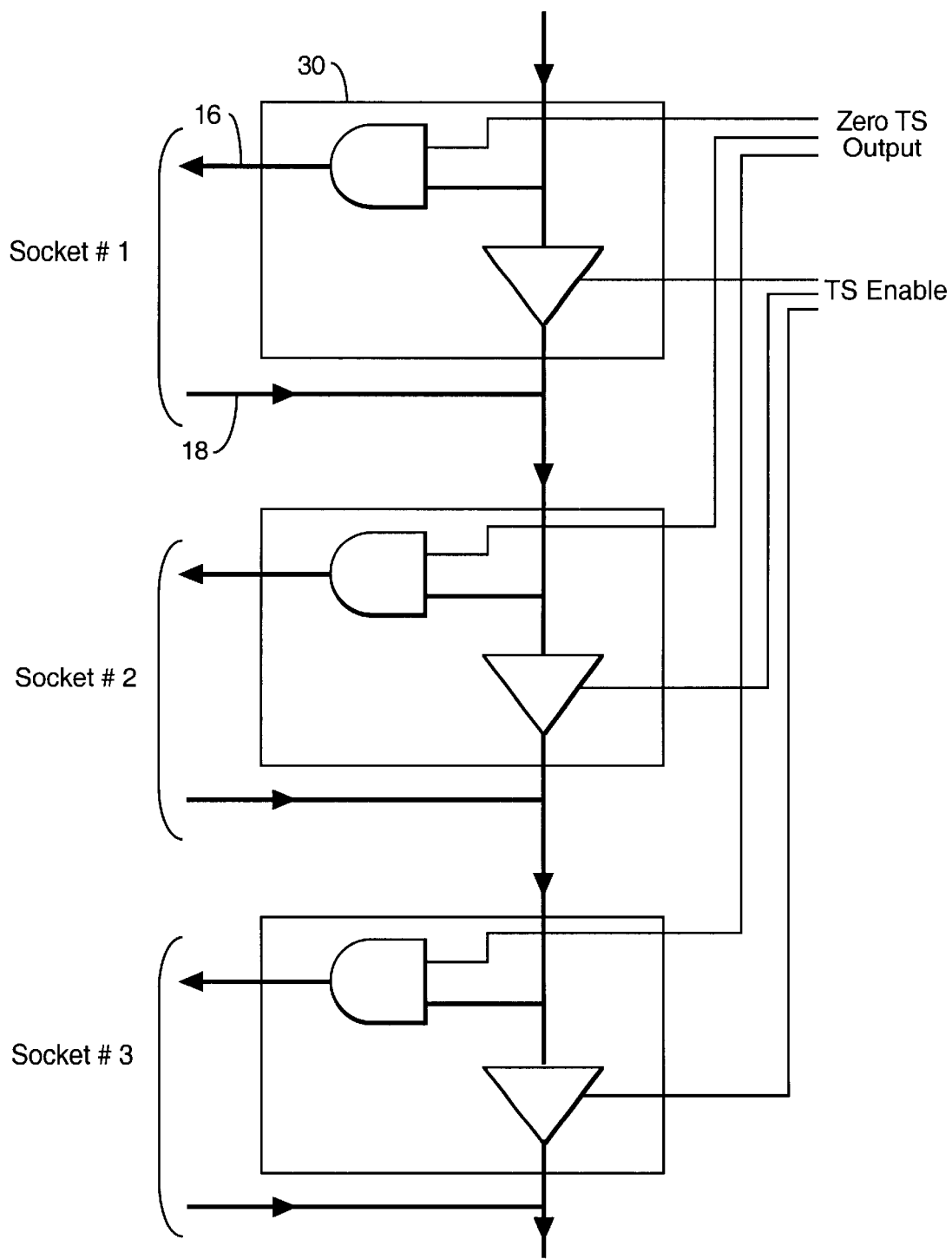

Specific embodiments of the invention will be described by way of example, with reference to the accompanying drawings.

A DVB receiver is connected to a number of sockets 2 by means of an interface 4 and some form of buffer 6.

The sockets 2 allow various conditional access subsystem (CASS) modules to be connected to the receiver.

Each CASS module controls access to a broadcast service, usually by descrambling a transmitted broadcast. The CASS module may also hold service entitle information, controlled by the service provider. The service provider may communicate with the CASS module using encrypted messages carrying descrambler keys and service management information.

By providing a number of different CASS modules, connected by means of the sockets 2, the interface 4 allows each service provider to use their own unique conditional access system with a common digital TV receiver, to use different conditional access systems in the same broadcast service and to change the conditional access system without changing the receiver.

The sockets 2 are preferably constructed as standard PC Card sockets. Although mechanically identical and electrically similar, several pins are redefined for use with the DVB receiver to provide the byte wide MPEG transport stream input and output to the PC Card module. In particular, the data stream considered here is an 11 bit bus comprising eight data lines, one data enable line, one packet data start line and one clock line. Other pins and lines of the PC Card module are used for other purposes, not discussed here.

Since a standard PC Card could inadvertently be inserted into one of the sockets 2, the system should be configured such that, when a card is inserted, it is presented with a standard PC Card interface, which is only switched to a DVB common interface when it has determined that the PC Card is compatible, eg. is a CASS module.

It is proposed to arrange the sockets 2 in a series or "daisy chain" structure, such that an MPEG transport stream is passed from one CASS module to the next. In this way, where an MPEG transport stream includes different broadcast services provided by different service providers, the CASS modules can operate on and descramble their respective services. In particular, the MPEG transport stream is passed to a first CASS module which descrambles the services for which it is provided. The MPEG stream including those descrambled services is then passed consecutively on to each next CASS module for it to descramble the services for which it is provided. The transport stream source is provided to the first CASS module in the series and the output of the last CASS module is provided to the DVB receiver.

The system allows a user to have two or more service provider's conditional access systems in one receiver without the need to swap CASS modules in and out of the receiver. However, there is a problem that where a CASS module is not inserted into a socket, the series or daisy chain structure is broken, such that the MPEG transport stream is not able to flow through all of the CASS modules to the receiver.

FIG. 2 illustrates a daisy chain structure using the preferred 11 bit bus. In particular, FIG. 2 illustrates a transport stream source 8 connected to an interface 10.

The interface 10 can be considered to comprise a plurality of interface sections 12, each for connection to a respective socket 2.

In general, each interface section 12 can be considered to have 11 bus lines 14 with which it receives data, 11 output lines 16 with which it transmits data to its socket 2, 11 input lines 18 with which it receives data from its socket 2 and 11 bus lines 20 with which it outputs data. In this way, data is passed from one interface section 12 to the next interface section 12 and an MPEG transport stream is passed consecutively through all of the CASS modules.

As illustrated in FIG. 2, each interface section 12 also includes a tristate buffer 22 which is connected between the input and output bus lines 14,20 or, in other words, between the output and input lines 16,18. By means of this tristate buffer 22, when the system detects that there is no module present on a particular socket 2, a TS enable line 24 may be used to enable the tristate buffer 22, thereby connecting the input bus lines 14 to the output bus lines 20 and, hence, effectively connecting the output lines 16 to the input lines 18.

In this way, when a CASS module is not connected to a socket 2, the MPEG transport stream need not be interrupted, the socket 2 may be by-passed and the interface section 12 may merely pass data straight through to the next interface section 12.

When a CASS module is first plugged into a socket 2, it is treated as a standard PC Card, as defined by PCMCIA. The receiver determines from the card information structure (CIS) present on the PC Card whether the card is a DVB compliant interface module or a standard PC Card. Only when the receiver has determined that the PC Card is compliant, can it then switch the transport stream data to the module.

In order to read the card information structure, the PC Card address lines A0 to A25 should be held stable, in particular during the read of each byte of the CIS. In a preferred embodiment, the transport stream input is provided to the PC Card CASS module on lines A16 to A25.

In order to prevent the transport stream data interfering with initial reading of the CIS, each interface section 12 is further provided with an output gate 26 which interrupts the output lines 16. In this way, transport stream data may be gated off from the input lines to the CASS module during the read of CIS.

As the CIS data is usually only a few hundred bytes, it is unlikely that these high order address lines will need to be asserted high during the read of CIS and holding them low should be sufficient. Hence, a control line 28 is provided for each output gate 26, such that these address line inputs may be held low during initialisation, but may then be allowed to receive the transport stream data during subsequent use.

FIG. 3 illustrates a further embodiment in which the tristate buffers 22 and output gates 26 are replaced by a single electronically controllable switch described here as a transport stream handler 30.

Figure 4B:
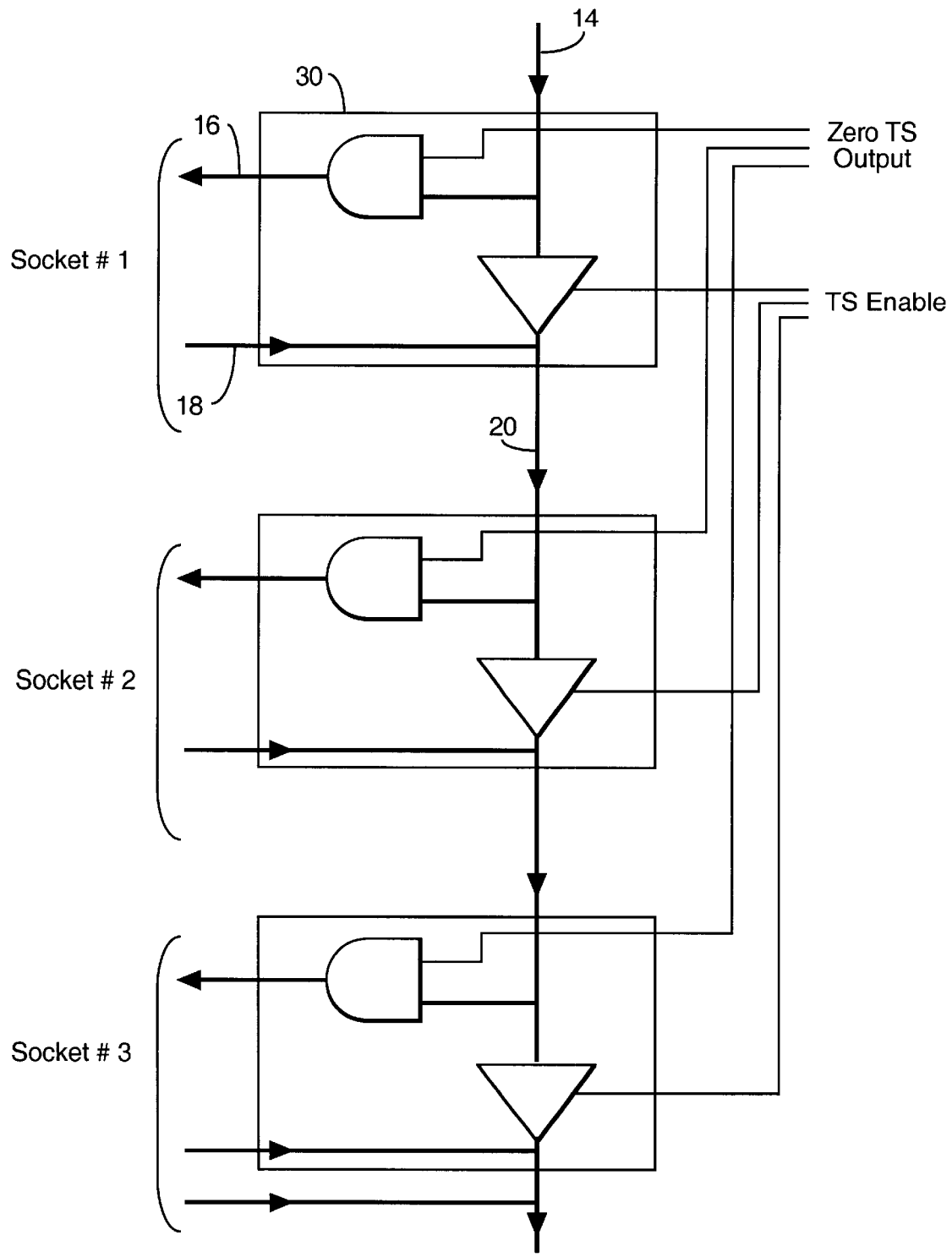

FIG. 4(a) illustrates schematically the internal structure of the transport stream handlers of FIG. 3 and FIG. 4(b) illustrates an alternative arrangement. The FIG. 4(b) arrangement is clearly more straightforward as a modular arrangement, but has the disadvantage of requiring an additional set of input lines.

The transport stream handler 30 replaces the tristate buffer 22 and output gate 26 of FIG. 2. It is particularly advantageous by having one input (of a plurality of lines) from the input bus 14 and two outputs (each of a plurality of lines), one to the output lines 16 and the other to the input lines 18 and output bus 20. It has a TS enable line 24 and a control line 28 and fulfils the same function as the tristate buffer 22 and output gate 26 of FIG. 2. However, by being provided as a single component, the number of pin connections is greatly reduced. In particular, it is not necessary to input the data to both the tristate buffer 22 and the output gate 26. Furthermore, the 11 way tristate buffer 22 and output gate 26 of FIG. 2 are not generally available and the cost of producing such custom devices is not desirable. According to the embodiments of FIGS. 3, 4(a) and 4(b), only one custom device, namely the transport stream handler 30, need be produced for each interface section 12, which, in combination with the reduction in pin count makes the arrangement highly desirable. Indeed, the transport stream handler 30 may be conveniently produced as a single integrated circuit.

It should be appreciated that the above description has considered only the transport stream lines. In practice, a CASS module will also use command lines and a command interface. The command lines could be configured in the manner described above. However, in view of the nature of the command data and its associated data rates, it is envisaged here that a microprocessor based bus interface such as shown in FIG. 1 could be used.

We claim:

1. An interface for connecting one or more conditional access modules to a receiver, the interface including:
   a plurality of interface sections, each for connection with a respective socket for receiving a conditional access module and each having a plurality of input lines and a plurality of respective output lines for connection to said socket, the interface sections being arranged in series, with the input lines of one interface section being connected to the respective output lines of the next interface section and with each interface section including an electronically controllable switch connecting the output lines of that interface section to the input lines of the same interface section, such that each socket may be selectively by passed.

2. An interface according to claim 1 wherein the electronically controllable switches are tristate buffers controllable by an enable line.

3. An interface according to claim 2 wherein each interface section comprises 11 input lines and 11 output lines and the tristate buffers are 11-way tristate buffers.

4. An interface according to claim 1 wherein each interface section includes an electronically controllable output gate which is controllable by a control line to selectively connect the plurality of output lines of that interface section to the respective socket or output a predetermined level in place of the levels on said plurality of output lines.

5. An interface according to claim 3 wherein each interface section includes an electronically controllable 11-way output gate which is controllable by a control line to selectively connect the 11 output lines of that interface section to the respective socket or output a predetermined level in place of the levels on said 11 output lines.

6. An interface according to claim 1 wherein the electronically controlled gate of each interface section is part of a transport stream handler which is additionally controllable to selectively connect the plurality of output lines of that interface section to the respective socket or output a predetermined level in place of the levels on said plurality of output lines.

7. An interface according to claim 1 wherein the receiver is a digital video receiver.

8. An interface according to claim 7 wherein the receiver is a DVB receiver.

9. An apparatus including an interface according to claim 1 and a transport stream source of a receiver, wherein the output lines of the first interface section of the series are connected to the transport stream source.

10. An apparatus according to claim 9 further comprising a respective socket connected to each interface section.

11. An apparatus according to claim 10, wherein each socket is a standard pc card socket.

12. An apparatus according to claim 9 wherein the receiver is a digital video receiver.

13. An apparatus according to claim 12 wherein the receiver is a DVB receiver.

14. An integrated circuit for use in a receiver, the integrated circuit comprising 11 input lines, 11 first output lines connected to the respective 11 input lines, 11 second output lines, an enable line for selectively connecting the input lines to the respective second output lines and a control line for selectively driving all the first output lines to zero irrespective of the levels of the input lines.

15. An integrated circuit according to claim 14 wherein the receiver is a digital video receiver.

16. An integrated circuit according to claim 15 wherein the receiver is a DVB receiver.

17. A method of arranging an interface for connecting one or more conditional access modules to a receiver, the interface including a plurality of interface sections, each for connection with a respective socket for receiving a conditional access module and each having a plurality of input lines and a plurality of respective output lines for connection to said socket, the method comprising:
    arranging the interface sections in series, with the input lines of one interface section connected to the respective output lines of the next interface section; and
    connecting the output lines of each interface section to the input lines of the same interface section via an electronically controllable switch, such that, when a conditional access module is not connected to the socket of an interface section, that socket may be selectively by passed.

18. A method according to claim 17 wherein the receiver is a digital video receiver.

19. A method according to claim 18 wherein the receiver is a DVB receiver.

* * * * *